(No Model.)

W. MAHONEY.
BICYCLE GEAR.

No. 491,366. Patented Feb. 7, 1893.

WITNESSES:
H. Walker
C. Sedgwick

INVENTOR
W. Mahoney
BY Munn & Co.
ATTORNEYS.

UNITED STATES PATENT OFFICE.

WILLIAM MAHONEY, OF NEW YORK, N. Y.

BICYCLE-GEAR.

SPECIFICATION forming part of Letters Patent No. 491,366, dated February 7, 1893.

Application filed March 31, 1892. Serial No. 427,149. (No model.)

*To all whom it may concern:*

Be it known that I, WILLIAM MAHONEY, of New York city, in the county and State of New York, have invented a new and Improved Bicycle-Gear, of which the following is a full, clear, and exact description.

My invention relates to improvements in bicycles, and more especially to the driving gear of safety bicycles. As a general thing, a bicycle rider has a reserve supply of strength which he cannot use to advantage in running the ordinary bicycle, from the fact that he cannot make his feet go fast enough to get a speed from the bicycle proportionate to his strength. The object of my invention is to obviate this difficulty and provide a simple and efficient driving gear which may be applied to the ordinary safety bicycle, so that a person may drive the machine very rapidly without making his feet move very fast.

To this end, my invention consists in certain features of construction and combinations of parts, which will be hereinafter described and pointed out in the claims.

Reference is to be had to the accompanying drawings forming a part of this specification, in which similar figures of reference indicate corresponding parts in both the views.

Figure 1:
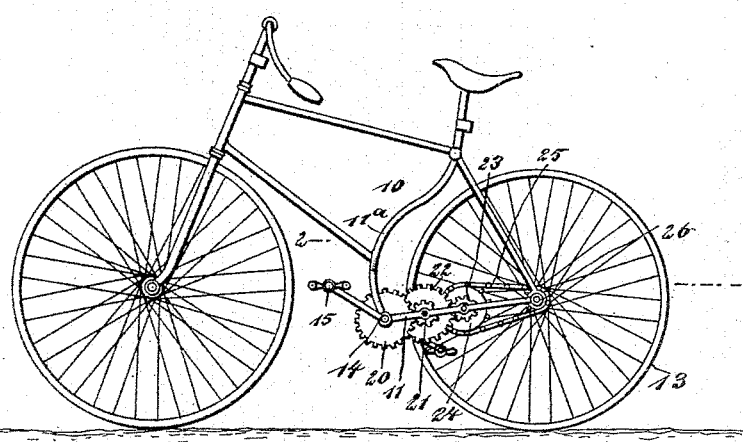
Figure 2:
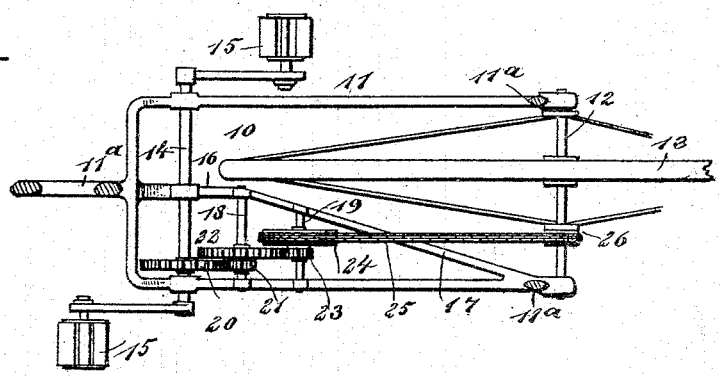

Figure 1 is a side elevation of a bicycle provided with my improved gear; and Fig. 2 is a broken sectional plan of the same, on the line 2—2 in Fig. 1.

The bicycle 10, is of the usual form, and may be of any form, and the bicycle is provided with a U-shaped frame 11, which is adapted to embrace the forward half of the rear wheel, the frame being formed integrally with the main frame 11$^a$ of the bicycle, and this frame as before remarked, may be of any form. The rear axle 12 of the wheel 13, is journaled in the rear end of the frame 11, and the driving shaft 14 is journaled in the forward end of the frame 11, as shown best in Fig. 2, this shaft having the pedals 15 connected therewith in the usual way. The U-shaped frame 11, has centrally therein near its forward end, a rearwardly-extending brace 16, in which the forward or driving shaft is journaled, and this brace merges in a diagonally or laterally-extending brace 17, the two braces 16 and 17 serving to give rigidity to the frame 11, and serving also as supports for the countershafts 18 and 19, which shafts are journaled in suitable bearings in the braces, and in one side of the frame 11. On the driving shaft 14, is a gear wheel 20, which engages a pinion 21 on the shaft 18, and fixed to this shaft is a gear wheel 22, which engages a pinion 23 on the shaft 19, which shaft carries a sprocket wheel 24, which connects by a chain 25, with a smaller sprocket wheel 26 on the hub of the rear wheel 13, in the usual manner. It will thus be seen that when the shaft 14 is turned comparatively slowly, the rear wheel 13 will be rapidly revolved, so as to propel the machine with great speed.

It will be understood that the construction of the frame 11 and its braces may be changed somewhat without departing from the principle of my invention, and it will also be understood that a greater or lesser number of gear wheels and pinions may be employed if desired, the number depending somewhat upon the strength and weight of the rider.

Having thus described my invention, I claim as new, and desire to secure by Letters Patent,—

1. The combination with a bicycle, of a U-shaped frame secured to the main frame and journaled on the rear axle, the U-shaped frame being made to embrace the front portion of the rear bicycle wheel, a shaft journaled in the U-shaped frame and having a sprocket wheel and chain connection with the rear bicycle wheel, a pedal-operated crank shaft journaled in the U-shaped frame, an intermediate shaft arranged between the crank shaft and the sprocket wheel shaft, and a gear connection between the crank shaft and the intermediate shaft, and between the latter and the sprocket wheel shaft, all substantially as described.

2. The combination, with a bicycle, of a U-shaped frame embracing the forward portion of the rear wheel and secured to the main frame, a brace connecting the front portion of the frame with one side thereof, a countershaft journaled in one side of the U-shaped frame and in the brace, said shaft having a sprocket mechanism connecting it with the bicycle driving wheel, a driving shaft journaled in the front portion of the U-shaped frame, and a speed-multiplying gear connection between the driving shaft and the counter-shaft, substantially as described.

WILLIAM MAHONEY.

Witnesses:
WARREN B. HUTCHINSON,
C. SEDGWICK.